April 2, 1963 E. B. JOHNSON 3,083,724
AUTOMATIC WATER SUPPLY CONTROL
Original Filed Jan. 6, 1959 3 Sheets-Sheet 1
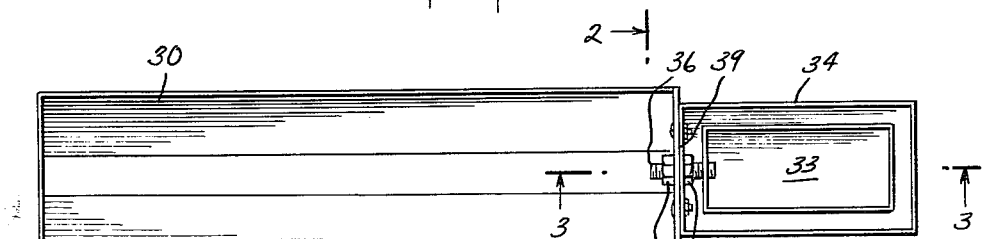
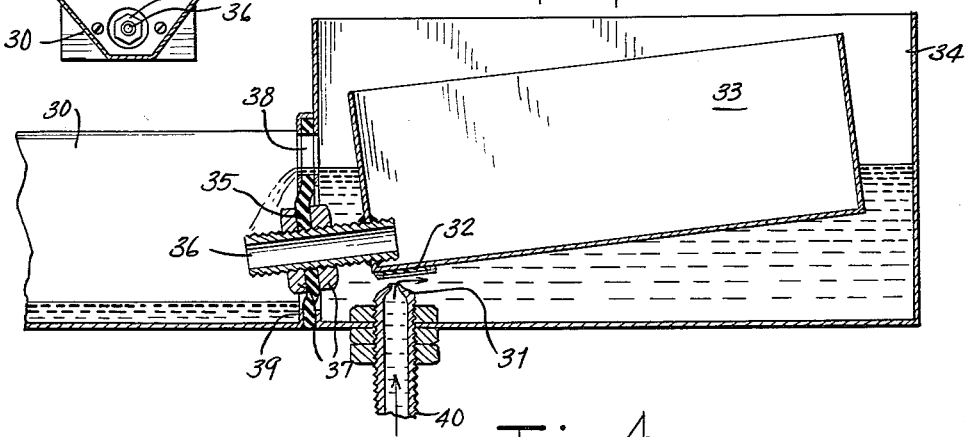
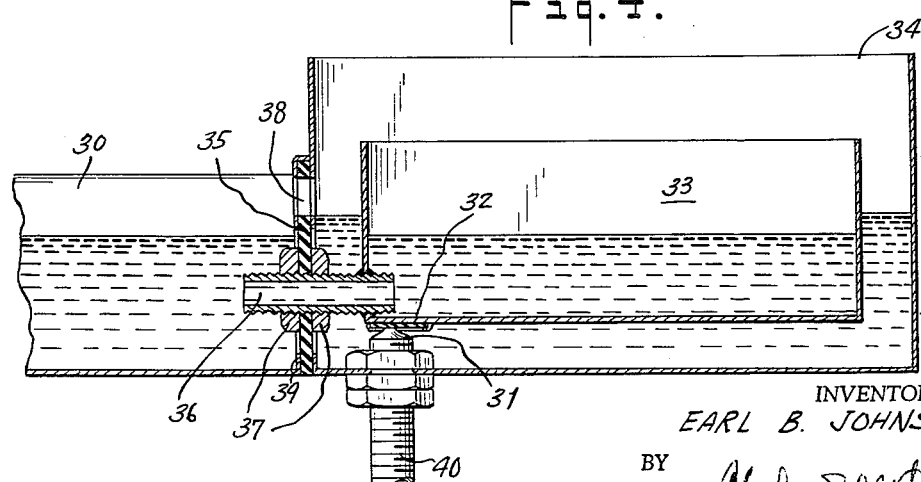
INVENTOR.
EARL B. JOHNSON
BY
ATTORNEY

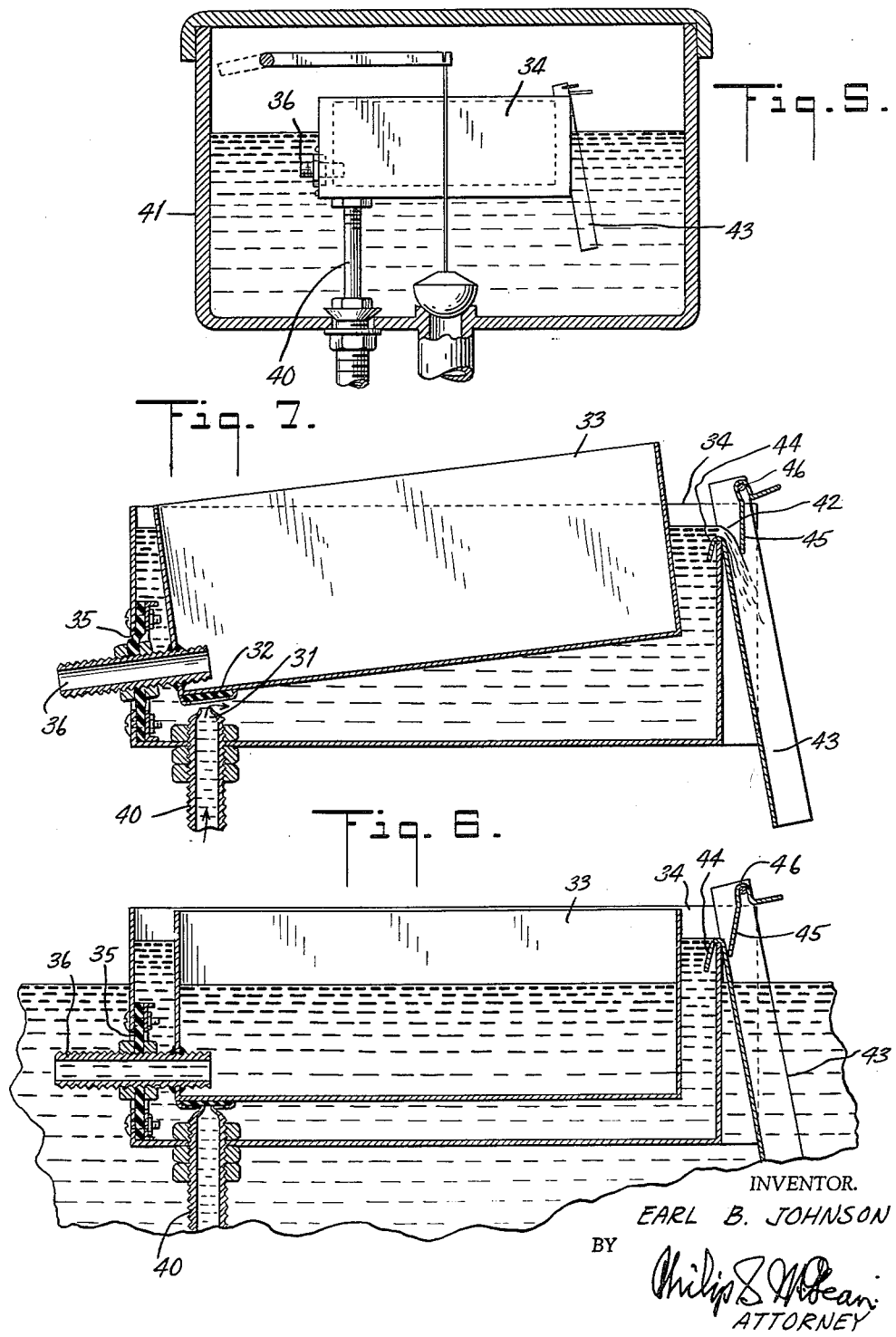

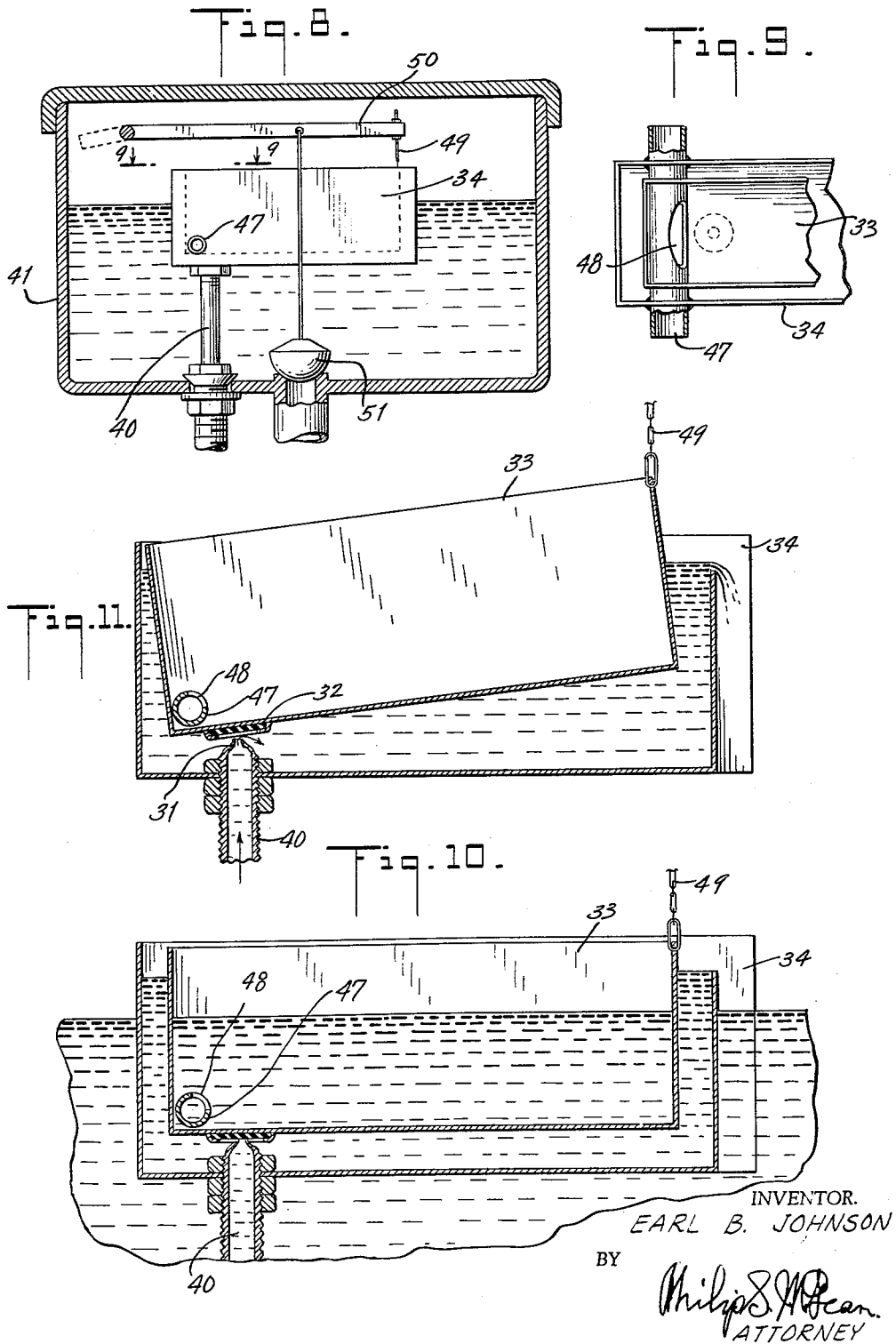

United States Patent Office 3,083,724
Patented Apr. 2, 1963

3,083,724
AUTOMATIC WATER SUPPLY CONTROL
Earl B. Johnson, R.D. 4, Box 252, Freehold, N.J.
Original application Jan. 6, 1959, Ser. No. 785,201. Divided and this application Feb. 9, 1961, Ser. No. 88,595
12 Claims. (Cl. 137—404)

The invention herein disclosed relates to control of the supply of water to various water consuming or disposal utilities, such as watering troughs, poultry fountains, flush tanks and the like.

Objects of the invention are to provide means for controlling admission of water to a tank or other holder to restore or replenish the supply as it is removed or disposed of, which will be of simple low-cost construction, consist of but few sturdy parts not likely to get out of order and which can be relied on to continue in operation indefinitely unattended and without requiring servicing or other attention.

These and other desirable objects have been accomplished in the present invention through a novel form of float structure arranged by its rising and falling action to control the flow from a supply source.

Other important objects accomplished and further novel features of construction, combinations and relations of parts are set forth and will appear in the course of the following specification.

The drawings accompanying and forming part of the specification illustrate a number of different practical embodiments of the invention but it will be appreciated that structure may be further modified and changed in regard to such illustration, all within the true intent and scope of the invention as hereinafter defined and claimed.

FIG. 1 in the drawings is a top plan view of one form of the invention applied to the control of a watering trough for poultry or other livestock.

FIG. 2 is a cross sectional view of the trough, on substantially the plane of line 2—2 of FIG. 1.

FIG. 3 is an enlarged broken longitudinal sectional view, on substantially the plane of line 3—3 of FIG. 1 showing the control float in empty, buoyant condition opening the valve mechanism to refill the trough.

FIG. 4 is a similar view showing the trough refilled and the float filled from the trough and thereby loaded and sunk in the valve closing position.

FIG. 5 is a broken vertical sectional view showing the invention applied to control of water in a flush tank, with the tank full and control float lowered holding the inlet valve mechanism, in this case a jet and float carried closure, as before, in closed position.

FIG. 6 is a broken vertical sectional view of the same parts, in the same position as in FIG. 5.

FIG. 7 is a similar view but showing the float in the buoyant condition, opening the valve means, in the act of refilling the tank.

FIG. 8 is a vertical sectional view of a tank installation illustrating a modification in which the control float is hinged on a tube open to the interior of the float and thereby providing a connection for emptying and filling the float to cause it to open and shut off the flow of liquid from the supply jet.

FIG. 9 is an enlarged broken sectional detail on substantially theh plane of line 9—9 of FIG. 8 showing the flow connection form of mounting for the float.

FIG. 10 is an enlarged broken sectional detail of the parts appearing in the tank filled position shown in FIG. 8.

FIG. 11 is a similar view but showing the float lifted by a connection from the tank emptying lever and in the buoyant condition holding the valve open.

In the several forms of the invention first illustrated, supply of liquid in a container, which may be considered a tank, is automatically restored as used, by float valve mechanism which operates the reverse of the usual action, rising to admit supply flow and lowering to shut off the flow.

In the first illustrated embodiment, FIGS. 1 to 4, the tank is in the form of a watering trough 30, the valve mechanism is in the form of a jet 31 and closure disk 32 as in my previously issued patents; 2,452,305, October 26, 1948; 2,662,503, December 15, 1953; 2,737,967, March 13, 1956, and 2,836,151, May 27, 1958, and control is effected by an open float 33 pivoted for rising and falling movements in a float chamber 34 which is in communication with the trough.

The pivotal mounting of the float is effected in this instance by a flexible diaphragm 35 of rubber or the like, separating the float chamber from the trough and through which there is extended a short tube 36 which is fixed in the lower portion of the float and is secured in the diaphragm or washer by clamp nuts 37.

This tube serves both as part of the hinge mounting for the float and as a means for emptying and filling the float for controlling the valve action.

The float chamber is shown as a rectangular compartment at the some level at the end of the trough and communication between the two is provided by an overflow opening 38 in the end wall 39 separating the float chamber from the trough.

By this opening 38, water filling the float chamber may overflow into the tank or trough.

The water supply furnished by the jet opens into the bottom of the float chamber. This assures that the float chamber will be filled and kept filled despite emptying of the trough.

The disk 32 forming the element which cooperates with the jet to form the valve is shown attached to the bottom of the float directly over the jet relatively close to the hing center so that the float will have considerable leverage for holding the disk in closed position on the jet.

In the normal, filled position of the trough or tank, with the hinge tube providing free communication between the tank and float, the float will be filled up to the level of the water in the tank, as shown in FIG. 4, and thus loaded to be held securely seated on the jet.

As water lowers in the tank it drains at the same rate from float 33 through hinge tube 36 into the tank.

While this is occurring water in the float chamber remains constant imparting buoyancy to the float as fast as water drains out of the float until a point is reached as shown in FIG. 3 where the float rises, opening the supply valve and refilling the tank by overflow at 38 from the float chamber into the tank.

The float, remaining in communication with the tank through tube 36, receives liquid from the tank and finally, with the tank refilled, settles to the lowered position shown in FIG. 4 closing off the liquid supply.

The flush tank form of the invention shown in FIGS. 5, 6 and 7 is generally similar to that described, the same reference numerals being employed for corresponding parts.

In this form the supply pipe 40, is utilized which carries the jet as a stem for supporting the float mechanism at the proper level in the flush tank 41.

The float drain and refilling tube 36 in this case as before opens directly into the tank to drain the float into the tank and to be filled by rising liquid in the tank.

FIGS. 5 and 6 show the tank filled by overflow from the float chamber 34 with the float loaded with water from the tank and holding the supply valve closed.

In the refilling operation illustrated in FIG. 7 the supply water entering the float chamber overflows over the end of the chamber at 42 into the tank. To quiet this flow of water a channel shaped trough is shown at 43 hooked at 44 over the edge of the overflow opening 42 and provided with a vane 45 pivoted to swing at 46 to quiet and spread the downflow of water entering the tank.

In the modified form of tank equipment illustrated in FIGS. 8 to 11 the float 33 is hingedly mounted in the float chamber 34 on a tube 47 extending across the lower portion of the float chamber and open at one or both ends to the interior of the tank.

This tube, at a point within the float, has an opening 48 providing communication between the float and tank.

This structure provides a mechanical hinge mounting for the float in place of the flexible hinge mount first described and it also provides the means of communication between tank and float for filling the float from the tank in the refilling operation and for emptying the float in the tank draining operation.

FIGS. 8 and 10 illustrate the normal filled position of tank and float with supply valve closed and FIG. 11 shows the float lifted either by buoyancy or, in this case, possibly by chain 49 shown connected with the tank flushing arm 50, to open the valve and effect refilling of tank.

The chain 49 provides a positive means for lifting the float at the same time that the ball valve 51 is lifted to flush the tank.

With this construction therefore the float will be lifted to open the supply valve as soon as the flush valve is opened and without any delay for the float acquired buoyancy necessary to open the supply valve.

The chain 49 is especially desirable when the tube 47 is not perfectly water-tight in the walls of the float chamber 34. This is because the water level in the float chamber may, in course of time, fall to the level in the float and there will be no buoyancy by water in the chamber. It will be noted that under these conditions a slow leaking ball valve may allow the tank level to fall so low that both the chamber and float may run nearly dry and the jet valve be kept closed substantially by the "weight-in-air" of the float.

In all forms of the invention the structure and operation are relatively simple and with no parts at all likely to get out of order. All mechanism can be produced and installed at low cost and is designed to continue in operation indefinitely without requiring any particular attention or servicing.

In the construction employing the separate float chamber 34, the float and chamber may be made in corresponding rectangular shape with the chamber just enough larger than the float to assure sufficient lifting buoyancy. This keeps the size of the parts down enabling the device to be used in places where space may be limited as well as reducing costs.

The invention is suited to many uses other than those shown and the tank, as it has been termed, may take many forms.

The float and other portions of the apparatus may be made of metal, plastic or other materials. If of plastic or other light materials, these may be weighted to operate properly.

Special advantages of the invention are that liquid is maintained at a constant level. The inlet valve is fully opened to quickly admit supply of liquid and remains fully opened during the filling operation so as not to restrict or retard replenishment of the supply. Also, it is of advantage in the case of a small leak at the ball valve in the flush tank forms of the invention, such leak will not start in-flow of liquid. Thus a slow leak will not keep a continuing in-flow or permit overflowing of the tank.

This application is a divisional application of my application Serial Number 785,201 filed January 6, 1959, now Patent No. 2,982,298.

The invention claimed is:

1. Automatic water supply control comprising the combination of a tank for storing a supply of liquid to be replenished as used, a hollow float in the tank, means for mounting the float for vertical pivotal movement in the tank, a liquid supply source including a float-controlled valve associated with said float and connected with said tank and arranged to be closed when the float is lowered and to be opened when the float rises in the tank, and liquid flow connections for filling said float from liquid rising in the tank and for draining liquid from the float into liquid lowering in the tank to thereby cause said float to rise and open said valve to refill the tank as liquid in the tank is lowered, and means for lifting said float independently of floating action by the water in the tank.

2. Automatic water supply control comprising the combination of a tank for storing a supply of liquid to be replenished as used, a float chamber connected to overflow into said tank to thereby refill itself in the act of refilling the tank, a hollow float arranged for rising, floating movement and lowering, sinking movement in said float chamber, a liquid supply source including valve means actuated by said float and connected to supply liquid to said float chamber on rising, floating movement of the float and to shut off supply of liquid to the float chamber on lowering, sinking movement of the float, and liquid flow connections between said float and tank with flexible means for separating the float chamber from the tank and mounting the flow connections, the latter arranged to drain liquid from the float into the tank on lowering of liquid in the tank and to pass liquid from the tank into the float on rising of liquid in the tank thereby to cause said float to rise and open flow into the float chamber and tank when liquid in the tank is reduced and to lower and shut off flow into the float chamber and tank when the tank is refilled.

3. Automatic water supply control comprising the combination of a tank for storing a supply of liquid to be replenished as used, a float chamber within said tank arranged for overflow into the tank at the highest level of the liquid within said chamber, a hollow float in the chamber, means for mounting the float for vertical pivotal movement in the chamber, a liquid supply source including a float-controlled valve associated with said float and connected with said chamber and arranged to be closed when the float is lowered and to be opened when the float rises in the chamber, and liquid flow connections for filling said float from liquid rising in the tank and for draining liquid from the float into liquid lowering in the tank to thereby cause said float to rise and open said valve to refill the tank as liquid in the tank is lowered and to cause said float to lower and shut-off flow into the float chamber and tank when the tank is refilled.

4. The invention according to claim 3, said means being a tube extending through the chamber and on which said float is pivotally mounted, with said tube provided with a side opening within the float and in liquid flow communication with said tank.

5. The invention according to claim 3, said float chamber being higher than the bottom of the tank to overflow into the tank, and means for smoothing and quieting the overflow from the float chamber into the tank.

6. The invention according to claim 3, in which said float chamber is connected to overflow into the tank and in which means are provided for smoothing and quieting the overflow from the float chamber into the tank including a downwardly directed flume extending from the float chamber into the tank.

7. The invention according to claim 3, wherein said float chamber is higher than the bottom of the tank to permit overflow into the tank, and means for smoothing and quieting the overflow from the float chamber into the tank including a downwardly directed flume extending from the float chamber into the tank and a flow smoothing vane at the entrance end of said flume.

8. The invention according to claim 3, with means for lifting said float independently of floating action by the water in the tank.

9. The invention according to claim 3, with said overflow into said tank directed over a portion of the upper edge of said chamber.

10. Automatic water supply control comprising the combination of a tank for storing a supply of liquid to be replenished as used, a float chamber connected to overflow from within the chamber into said tank at the highest level of the liquid within said chamber, a hollow float arranged for rising, floating movement and lowering, sinking movement in said float chamber, a liquid supply source including valve means actuated by said float and connected to supply liquid to said float chamber on rising, floating movement of the float and to shut off supply of liquid to the float chamber on lowering, sinking movement of the float and liquid flow connections between float and tank arranged to drain liquid from the float into the tank on lowering of the liquid in the tank and to pass liquid from the tank into the float on rising of liquid in the tank thereby to cause said float to lower and shut off flow into the float chamber and tank when the tank is refilled, and to cause said float to rise and open said valve to refill the tank as liquid in the tank is lowered.

11. The invention according to claim 10, the tank having a wall separating the interior of the tank from the float chamber, said wall being provided with a flexible diaphram for pivotally mounting the float for rising and lowering movement within said chamber, said liquid flow connections including a tube extending from within the float through said flexible diaphragm into liquid flow communication with the tank.

12. Automatic water supply control comprising the combination of a tank for storing a supply of liquid to be replenished as used, an upwardly open float chamber connected to overflow into said tank to thereby refill itself in the act of refilling the tank, a hollow float arranged for rising, floating movement and lowering, sinking movement in said float chamber, a liquid supply source including valve means actuated by said float and connected to supply liquid to said float chamber on rising, floating movement of the float and to shut off supply of liquid to the float chamber on lowering, sinking movement of the float and liquid flow connections between said float and tank arranged to drain liquid from the float into the tank on lowering of liquid in the tank and to pass liquid from the tank into the float on rising of liquid in the tank thereby to cause said float to rise and open flow into the float chamber and tank when liquid in the tank is reduced and to lower and shut off flow into the float chamber and tank when the tank is refilled and with a tube extending through the float chamber and forming part of said liquid flow connections, the float being pivotally supported by said tube and said tube having an open communication with the interior of said float.

References Cited in the file of this patent

UNITED STATES PATENTS

| 85,386 | Hunter | Dec. 29, 1868 |
| 251,125 | Mehring | Dec. 20, 1881 |
| 352,047 | Dewey | Nov. 2, 1886 |
| 384,119 | Blatchley | June 5, 1888 |
| 826,882 | Powers | July 24, 1906 |
| 2,608,207 | Le Van | Aug. 26, 1952 |
| 2,784,735 | Barr et al. | Mar. 12, 1957 |

FOREIGN PATENTS

| 827,894 | Great Britain | Feb. 10, 1960 |